United States Patent [19]

Alexander et al.

[11] Patent Number: 4,648,756

[45] Date of Patent: Mar. 10, 1987

[54] TWO SPEED AUTOMATIC SHIFT DRILL

[75] Inventors: Robert H. Alexander, Columbia; John R. Lawson, Irmo; Ronald C. Falter, Columbia, all of S.C.

[73] Assignee: Allen-Bradley Company, Inc., Milwaukee, Wis.

[21] Appl. No.: 808,583

[22] Filed: Dec. 13, 1985

[51] Int. Cl.$^4$ ............................................. B23B 45/04
[52] U.S. Cl. ........................................ 408/9; 91/184; 173/18; 408/12
[58] Field of Search .................... 408/130, 133, 99, 11, 408/12, 7, 9, 16; 173/18, 19, 20, 21, 145, 146; 91/184, 189 R

[56] References Cited

U.S. PATENT DOCUMENTS

| | | | |
|---|---|---|---|
| 1,787,781 | 1/1931 | Galloway | 408/9 |
| 2,030,888 | 2/1936 | Morgan | 408/9 |
| 2,691,314 | 10/1954 | Stevens et al. | 81/52.4 |
| 3,126,766 | 3/1964 | Bent | 173/19 |
| 3,266,580 | 8/1966 | Clapp et al. | 408/9 |
| 3,301,333 | 1/1967 | Linsker | 408/16 |
| 3,319,494 | 5/1967 | Ulbing | 74/812 |
| 3,526,158 | 9/1970 | Adams et al. | 408/9 |
| 3,552,238 | 1/1971 | Quackenbush | 77/32.8 |
| 3,583,822 | 6/1971 | Alexander et al. | 408/11 |
| 3,598,497 | 8/1971 | Nyman | 408/11 |
| 3,679,320 | 7/1972 | Bohorquez et al. | 408/99 |
| 3,802,792 | 4/1974 | Quackenbush | 408/130 |
| 3,845,673 | 11/1974 | Karden et al. | 74/751 |
| 4,083,646 | 4/1978 | Vindez | 408/133 |
| 4,198,180 | 4/1980 | Schultz | 408/12 X |
| 4,453,868 | 6/1984 | Winslow | 173/146 X |

FOREIGN PATENT DOCUMENTS 2104973  3/1985  United Kingdom ................. 408/12

Primary Examiner—William R. Briggs
Attorney, Agent, or Firm—Quarles & Brady

[57] ABSTRACT

An automatic shift drill for rotationally driving a bit into a laminated workpiece at one of two speeds according to the depth of the bit in the workpiece is disclosed. A cam block element has flag sections and gap sections corresponding to the various layers of the workpiece. The cam block element is mounted on a spindle of the drill to move in translation with the bit. A vent element has an orifice which is adapted to be closed when it is adjacent to one of the flag sections and open when it is adjacent to one of the gap sections. Shifting means responsive to pneumatic pressurization changes the rotational speed of the bit from one speed to the other speed. The orifice vents the shifting means when it is adjacent to a gap section to drive the bit at the appropriate speed through the corresponding layer and seals the shifting means when it is adjacent to a flag section to drive the bit at the other speed appropriate for the layer corresponding to the flag section.

9 Claims, 9 Drawing Figures

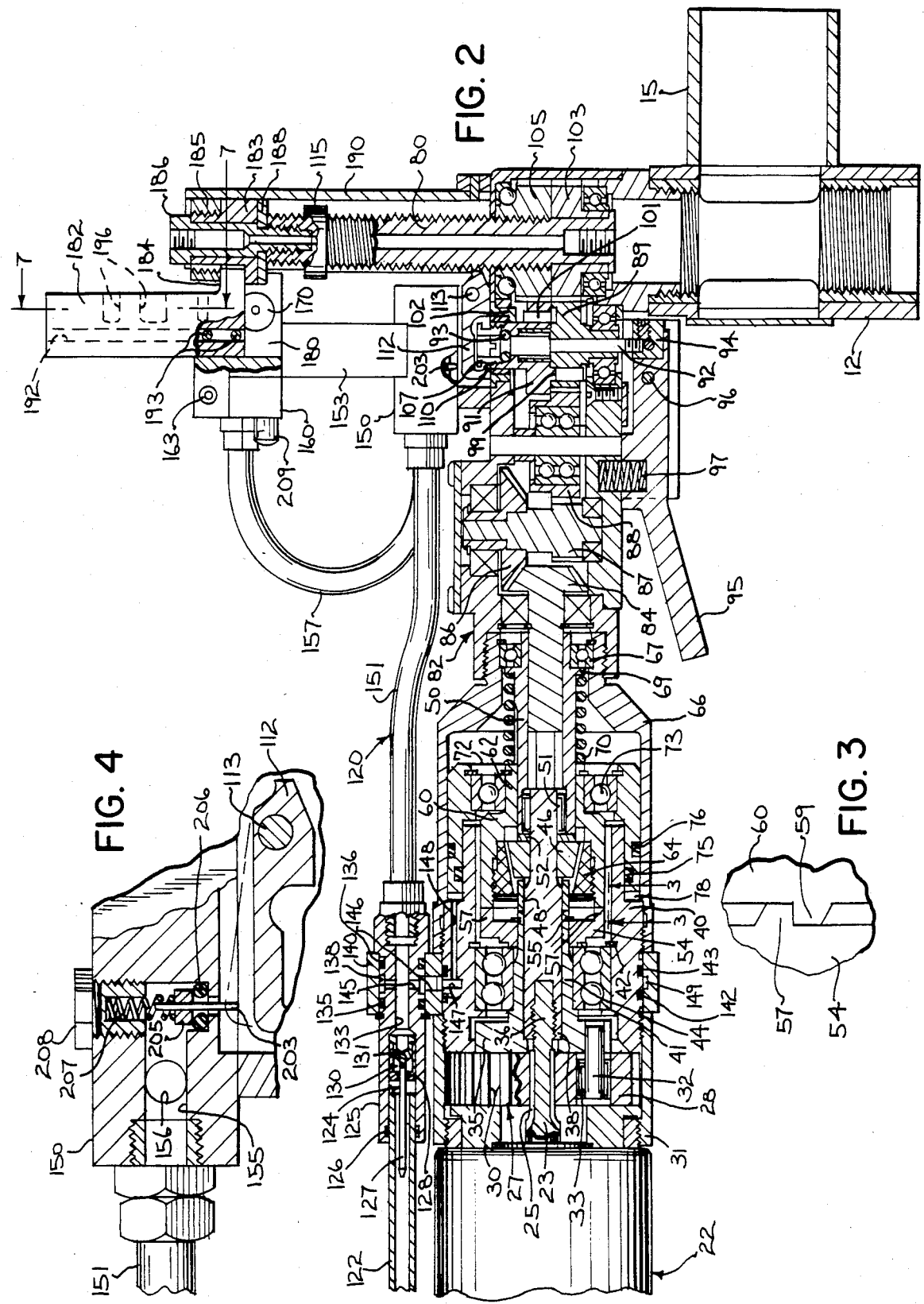

TWO SPEED AUTOMATIC SHIFT DRILL

BACKGROUND OF THE INVENTION

This invention relates to drills and more particularly to drill controls for automatically changing the speed of a bit in response to the depth of the bit in a workpiece.

Oftentimes a workpiece to be drilled is made up of a number of layers of different materials. The different layers may consist of difficult to drill materials sandwiched with easier to drill materials. For example, a typical workpiece (such as in current aerostructures) might consist of one greater inch of titanium that requires a drill speed of 360 rpm followed by an inch of aluminum, which should be drilled at 4000 rpm, and then a quarter inch of stainless steel, which also must be drilled at a lower speed. If the aluminum is drilled at the low speed required for the titanium, it takes a substantial amount of time to drill through the aluminum. If, however, the aluminum can be drilled at 4000 rpm, it takes less than one tenth of the amount of time that it otherwise would.

Therefore, a need exists for a drill which automatically changes the speed of the bit in response to the depth of the bit in the workpiece.

SUMMARY OF THE INVENTION

The invention provides a drill for rotationally driving a bit into a workpiece at one of two speeds according to the depth of the bit in the workpiece. A cam block element has a flag section and a gap section and a vent element has an orifice which is adapted to be closed when it is adjacent to the flag section and open when it is adjacent to the gap section. One of the elements is mounted to move in translation with the bit and the other of the elements is mounted to be stationary with respect to the workpiece, with the orifice and the cam block element in operative relationship to one another so that either the flag section or the gap section is adjacent to the orifice depending on the depth of the bit in the workpiece. The orifice is in communication with a source of compressed air and with a shifting means which is responsive to pneumatic pressurization to change the rotational speed of the bit from one speed to the other. The orifice vents the shifting means when it is adjacent to the gap section to drive the bit at one speed and seals the shifting means when it is adjacent to the flag section to change the speed of the bit to the other speed.

With this arrangement, the cam block element can be made with flag sections and gap sections corresponding to the various layers of a workpiece. Each flag section or gap section corresponds in length and position to the thickness and position of one of the layers. Therefore, the bit is driven at the appropriate speed through each layer to save substantial amounts of time in drilling laminated workpieces. Moreover, the drill can be adapted to be used with a variety of workpiece configurations by simply changing the cam block element.

In another aspect, vent means are provided which are responsive to retraction of the bit from the workpiece. The vent means depressurizes the shifting means to change the speed of the bit to the lower of the two speeds. This feature helps save wear on the drive train of the drill.

In a preferred aspect, a transmission output shaft is coupled to a spindle for mounting the bit by a gear means. A planetary gear unit for driving the output shaft includes a sun gear adapted to be driven rotationally at a high speed, planet gears to orbit around the sun gear at a low speed, and a planet cage journalling the planet gears to revolve around the sun gear with the planet gears at the low speed. The shifting means shifts between coupling the transmission output shaft directly to the sun gear or to the planet cage to change between the high and low speeds. This arrangement provides a large reduction from the high speed to the low speed in a relatively small space.

In yet another aspect, the shifting means includes an annular piston shiftable by pneumatic pressurization from a first axial position to a second axial position. A clutch cup is mounted on the transmission output shaft to be rotationally engaged with and axially slidable relative to the output shaft. Bearing means couples the annular piston to the clutch cup so that the annular piston remains rotationally stationary and the clutch cup moves axially with the annular piston between the first and second positions. Biasing means urges the clutch cup into the first position. The clutch cup has lugs at an axial end thereof which mate with corresponding lugs on the planet cage in the first position and has a clutch half on the inside thereof which mates in the second position with a clutch half driven at the speed of the sun gear. This provides a rugged shifting mechanism which is simple to manufacture and assemble.

It is therefore a principal object of the invention to provide a drill which automatically shifts from one speed to another according to the depth of a bit in the workpiece being drilled.

It is another object of the invention to provide such a drill which can be easily and inexpensively manufactured and assembled.

It is another object of the invention to provide such a drill which is reliable in its operation, easy to use, and adaptable to be used with a variety of workpiece configurations.

It is another object of the invention to provide such a drill which is air operated.

These and other objects and advantages of the invention will be apparent from the following detailed description and drawings.

DESCRIPTION OF THE DRAWINGS

FIG. 2 is a sectional view of a portion of the drill of FIG. 1 illustrating in detail portions of a drive train and pneumatic circuit for the drill;

FIG. 3 is a view from the plane of the line 3—3 of FIG. 2;

FIG. 4 is a detail side view of a retract vent for the drill of FIG. 2;

DETAILED DESCRIPTION OF THE PREFERRED EMBODIMENT

Figure 1:
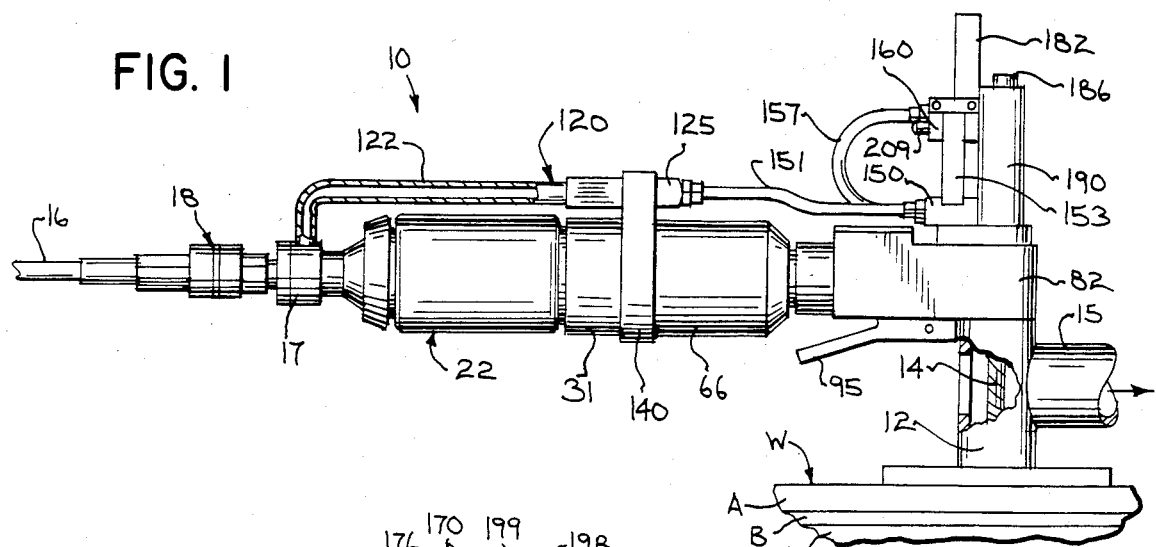
FIG. 1 is a side elevation view with portions broken away illustrating a two speed automatic shift drill of the present invention in position to drill a workpiece.

Referring to FIG. 1, a two speed automatic shift drill 10 of the invention is shown. The drill 10 has a mounting nose 12 which is shown attached to a workpiece W made up of a number of layers A, B, C. The drill 10 rotationally drives and translationally feeds a bit 14 to bore a hole in the workpiece W. A vacuum duct 15 can be connected to the nose 12 to remove chips from the area of the workpiece W.

The drill 10 is pneumatic, being powered by compressed air. Compressed air is supplied to the drill 10 by a flexible hose 16 which is connected to an air inlet chamber 17 of the drill 10 by a quick connect 18.

Just forward of the air inlet chamber 17 is a conventional governed air motor 22 such as one of the sliding vane type. The air motor 22 is the prime mover which converts the compressed air into rotary power which is used, via the automatic shift transmission hereinafter described, to drive the bit 14. Referring to FIG. 2, the air motor 22 has an output shaft 23 which turns at a very high speed, typically on the order of 12,000 rpm.

The air motor shaft 23 is integral with a sun gear 25 of a planetary gear unit 27. The unit 27 also includes three planet gears 28 (one shown) which mesh with the sun gear 25 and also with internal gear teeth 30 formed in housing section 31. Therefore, the sun gear 25 is driven rotationally at a high speed and the planet gears 28 revolve around the sun gear at a lower speed. In the preferred embodiment, the planet gears 28 orbit around the sun gear 25 at about 1/11th of the speed of the sun gear.

Each of the planet gears 28 are journaled on a pin 32 by a needle bearing 33. Each pin 32 extends into a planet gear cage 35, which revolves around the sun gear 25 with the planet gears 28. The sun gear 25 has a forward integral threaded shaft 36 which extends forwardly into the planet gear cage 35 and is threaded into an extension shaft 38. The direction of the threads is such that the shaft 36 tends to tighten in the shaft 38 in the direction of rotation. The extension shaft 38 is within the planet gear cage 35 with a small clearance and the planet gear cage 35 is journaled within an intermediate housing 40 by a double ball bearing 41. The intermediate housing 40 is screwed into the forward end of the housing section 31. The bearing 41 is locked axially between a shoulder of the intermediate housing 40 and a snap ring 42.

The extension shaft 38 extends through and beyond a quill shaft portion 44 of the planet gear cage 35. A clutch half 46 is axially splined onto the extension shaft 38 and is separated from the forward end of the quill shaft portion 44 by a spacer sleeve 48. The end of the extension shaft 38 is journaled in the rearward end of a transmission output shaft 50 by a needle bearing 51. A spacer washer 52 separates the clutch half 46 from the end of the output shaft 50.

The planet gear cage 35 also includes a flange 54 which is axially splined onto the forward end of the quill shaft portion 44 and is held axially between the ball bearing 41 and a snap ring 55 to fix the planet gear cage 35 and planet gears 28 axially. The flange 54 has a plurality of lugs 57 which project from its forward face and are spaced equally around the flange 54. The lugs 57 mate with similar lugs 59 which project from the rearward end of a clutch cup 60 when the clutch cup is in a rearward position as shown in FIG. 3. The clutch cup 60 has a forward portion 62 which is axially splined on the output shaft 50 so that the clutch cup 60 can slide axially on the output shaft 50 but to restrain relative rotation between the clutch cup 60 and the output shaft 50.

The clutch cup 60 also has a clutch half 64 firmly secured in its rearward larger diameter portion such as by screwing the clutch half 64 into the clutch barrel 60 in the direction of rotation of the sun gear 25. The clutch half 64 is made of a relatively soft material such as brass and has an inner frustoconical surface which mates with an outer frustoconical surface of the clutch half 46 in frictional engagement when the clutch cup 60 is shifted to a forward position (not shown). In the forward position, the lugs 57 and 59 are disengaged. Note that the spacer sleeve 48 is long enough to ensure that the clutch halves 46 and 64 are disengaged in the rearward position.

The output shaft 50 is journaled in a forward housing section 66 by a ball bearing 67. The ball bearing 67 is restrained axially in the housing section 66 and the housing section 66 is secured on the intermediate housing 40. Therefore, the sun gear 25, the planet gears 28, the planet gear cage 35, the extension shaft 38, the clutch half 46 and the output shaft 50 are all axially stationary. The output shaft 50 has a flange 69 adjacent to the ball bearing 67. A compression spring 70 extends between the flange 69 and the forward end of the clutch cup 60 to bias the clutch cup into the rearward position.

The clutch cup 60 is shifted into the forward position to disengage the lugs 57 and 59 and engage the clutch halves 46 and 64 by an annular piston 72. The piston 72 is coupled to the clutch cup 60 by a ball bearing 73 so that the piston 72 remains rotationally stationary. The piston 72 has a rearward skirt portion which is provided with inner and outer grooves to receive O-rings 75 and 76, respectively, to seal a chamber 78 behind the piston 72.

The output shaft 50 drives a head gear box 82 which is secured to the forward housing section 66. A spindle 80, into which the bit 14 is mounted, is driven rotationally at a certain speed by the head gear box 82. Therefore, the speed of the bit 14 can be varied by controlling the speed of the output shaft 50.

The head gear box 82 is a positive feed mechanism, meaning that the translational feed is mechanically related to the rotational speed to feed at a fixed distance per revolution, and is fully described in Alexander et al. U.S. Pat. No. 3,583,822, issued June 8, 1971, which is hereby incorporated by reference. Therefore, controlling the speed of the output shaft 50 also controls the time rate that the bit 14 penetrates the workpiece. Such a head gear box is also available commercially as part of a drill under the trade designation 41PA from Allen-Bradley Fastening Systems Division, Columbia, S.C. 29202.

Briefly, the gear box 82 includes a beveled drive gear 84 which is coupled to rotate with the output shaft 50. The drive gear 84 is journaled in the gear box 82 to drive a second beveled gear 86. A spur gear 87 rotates with the beveled gear 86 and meshes with another spur gear 88. The spur gear 88 engages a third spur gear 89. A clutch gear 91 is slidable along the axis of the gear 89 by means of a shaft 92 acting through a ball bearing 93. The shaft 92 is connected by a pivoting block 94 to a lever 95 which is pivotal about pin 96 and biased by a compression spring 97.

In a feed position (shown), lugs 99 of the clutch gear 91 engage corresponding lugs on the spur gear 89 so that the clutch gear 91 is driven by the spur gear 89. In an upwardly shifted retract position (not shown), the lugs 99 are shifted out of engagement with the spur gear 89 and lugs 101 on the upper face of the clutch gear 91 engage corresponding lugs on a stationary cover member 102 which is fixed to the gear box 82. Intermediate the retract and the feed positions, none of the lugs 99 or 101 are engaged so that the clutch gear 91 is free wheeling in a neutral position.

A rotary drive gear 103 is mounted to the spindle 80 to rotationally drive the spindle but to enable the spindle to slide up and down within the gear 103. The gear 103 is driven by the spur gear 89. A feed gear 105 is internally threaded to mesh with threads on the spindle 80 and can rotate relative to the gear 103. The feed gear 105 is driven by the clutch gear 91.

The gear ratio between the gears 91 and 105 is different from the gear ratio between the gears 89 and 103. Therefore, in the feed position of the clutch gear 91, the feed gear 105 rotates relative to the spindle 80 so that the spindle 80 is advanced downwardly (the feed gear 105 rotates slightly faster than the spindle 80). In the retract position, the clutch gear 91 is stopped so that the feed gear 105 is stopped, and the turning of the spindle 80 relative to the feed gear advances the spindle 80 upwardly very quickly.

Therefore, when the shaft 92 is shifted upwardly, the spindle 80 is retracting and when the shaft 92 is shifted downwardly, the spindle 80 is feeding. Attached to be shifted with the shaft 92 is a bearing cap 107. The cap 107 has a flange 108 which is captured by a lip 110 of a lever 112. The lever 112 is pivotal about pin 113. Therefore, in the retract position, the rearward end of the lever 112 is pivoted upwardly. Also note that the shaft 92 and lever 112 are pivoted into the retract position by a collar 115 secured to the spindle 80 as the spindle 80 approaches the downward end of its stroke to automatically retract the bit 14 from the workpiece W at the end of a drilling operation.

During a particular drilling operation, it may be desirable to change the speed and feed of the bit 14, such as when the bit 14 penetrates through layer A to layer B or layer B to layer C and the adjacent layers are of different materials with different drilling characteristics. The invention provides automatic shifting from one speed and feed to another by automatically changing the input speed of the head gear box 82 in response to the depth of the bit 14 in the workpiece W.

The input speed is changed by shifting the piston 72 between the forward and rearward positions. In the rearward position, the lugs 57 and 59 are engaged so that the head gear box 82 is driven by the planet gear cage 35 at about 1/11th of the speed of the air motor shaft 23. In the forward position, the clutch halves 64 and 46 are engaged so that the head gear box 82 is driven by the sun gear at the full speed of the air motor shaft 23.

The driving faces of the lugs 57 and 59 are squared off and the opposite faces are angled (as shown, the direction of rotation would be such that the bottom of the clutch cup 60 would be going into the sheet). This is because when the piston 72 shifts, the clutch cup 60 will be going 11 times as fast as the planet cage 35 due to its inertia. The lugs 59 will therefore overrun the lugs 57, which is facilitated by their angled sides. However, driving forces are positively transferred from the planet cage 35 to the clutch cup 60 by the squared off sides of the lugs 57 and 59.

The piston 72 is normally biased into the rearward, slow position by the compression spring 70. It is shifted to the forward, fast position by a pneumatic circuit 120 which pressurizes the chamber 78 is response to the depth of the bit 14 in the workpiece W.

The pneumatic circuit 120 includes a supply tube 122 which is in communication with a source of compressed air. As shown in FIG. 1, the supply tube 122 receives compressed air from the air inlet chamber 17 so that flexible hose 16 also supplies compressed air to the pneumatic circuit 120. The supply tube 122 delivers the compressed air to a restriction 124 in a tubular manifold 125. The supply tube 122 is sealed in the manifold 125 by an O-ring 126.

The restriction 124 substantially diminishes the flow rate of air into the remainder of the pneumatic circuit 120. The restriction 124 shown is in two parts: a needle 127 and a seat 128. The needle 127 extends through a hole in the seat 128 and into the supply tube 122 to facilitate removal of the restriction 124 from the manifold 125. Leakage between the needle 127 and the seat 128 into chamber 130 and through passageways 131 supply compressed air to a lumen 133 of the manifold 125. Of course, many other restriction configurations could be employed. However, the restriction 124 is preferred because the air flow can be changed by simply exchanging one seat 128 for another seat 128 with a different sized hole through which the needle 127 extends.

The manifold 125 is sealed by O-rings 135 and 136 in a bore 138 through a ring 140. The ring 140 is clamped between the housing sections 31 and 66 and is sealed by O-rings 142 and 143 to the intermediate housing 40. Communication is provided between the lumen 133 through the manifold 125, the ring 140 and the intermediate housing 40 to the chamber 78 by a passageway including bores 145, 146, 147 and 148. Note that an inner groove 149 can be provided in the ring 140 to provide compressed air around its inner periphery to several such passageways (not shown) providing communication with the chamber 78.

The forward end of the lumen 133 communicates with a retract vent 150 by means of an air line 151. The retract vent 150 is rigidly secured to the head gear box 82 by appropriate means such as bolting, welding, etc. and post 153 is fixed to the retract vent 150 and extends upwardly from it.

Figure 5:
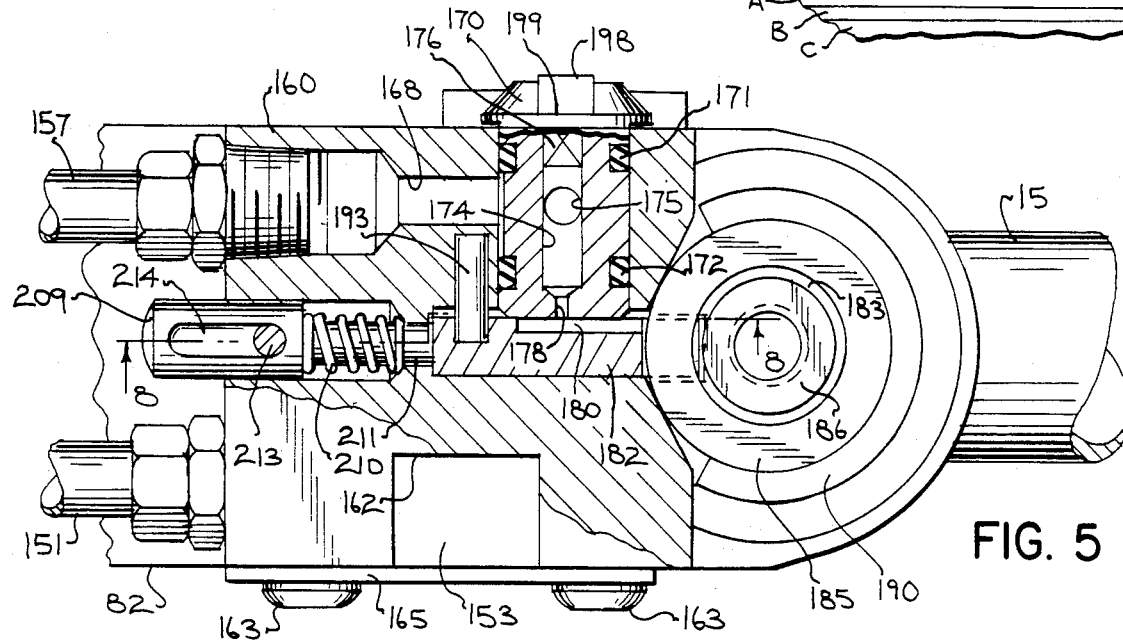
FIG. 5 is a sectional view of a portion of the drill taken along the line 5—5 of FIG. 8.

Referring to FIG. 4, in the retract vent 150 the air line 151 opens into a passageway 155 which is in communication via a passageway 156 with the lower end of an air line 157 (FIG. 2). The air line 157 provides communication between the retract vent 150 and a sensor head 160. Referring to FIG. 5, a groove 162 is formed in the sensor head 160 which closely receives the post 153. The sensor head 160 is clamped to the post 153 by cap screws 163 and strap 165 which bridges the groove 162. The groove 162 is slightly shallower than the post 153 is deep so that tightening the screws 163 secures the sensor head 160 on the post 153.

The air line 157 opens into a passageway 168 in the sensor head 160 as shown in FIG. 5. The passageway 168 leads to a cross bore in which a vent 170 is slidably disposed and is sealed by O-rings 171 and 172. The vent 170 has an axial bore 174 which is in communication with the passageway 168 via bore 175. The outer end of the bore 174 receives a plug 176 and the inner end is coterminus with an orifice 178 which opens into a channel 180 formed in the sensor head 160.

Positioned in the channel 180 is a cam block 182. The cam block 182 is mounted to the spindle 80 to travel up and down in translation with the spindle 80 and bit 14 but to be rotationally stationary. As illustrated in FIG. 2, the cam block 182 is replacebly mounted to a sleeve 183. The cam block 182 has a tang 184 which fits into an axial groove machined into the sleeve 183. A ring 185 is then threaded onto the sleeve to keep the tang 184 from coming up out of the groove in the sleeve 183. The tang is loose fitting in the groove, even with the ring 185 assembled, to isolate the cam block 182 from eccentricities in the spindle 80 and in a shoulder bolt 186. The bolt 186 extends through the sleeve 183 and is threaded into the spindle 80 to rotate with the spindle and journal the sleeve. A bushing 188 is clamped against the spindle 80 by the bolt 186 and also journals the sleeve 183.

The cam block 182 being captured in the channel 180 holds the sleeve 183 rotationally stationary. An outer guard 190 is stationarily mounted to the head gear box 82 to further steady the cam travel. Also, the cam block 182 is provided with a groove 192 which slidably receives a pair of pins 193 mounted in the sensor head 160 to guide the cam block as it slides up and down.

Figure 7:
FIG. 7 is a sectional view of a cam block for the drill taken from the plane of the line 7—7 of FIG. 2.
Figure 9:
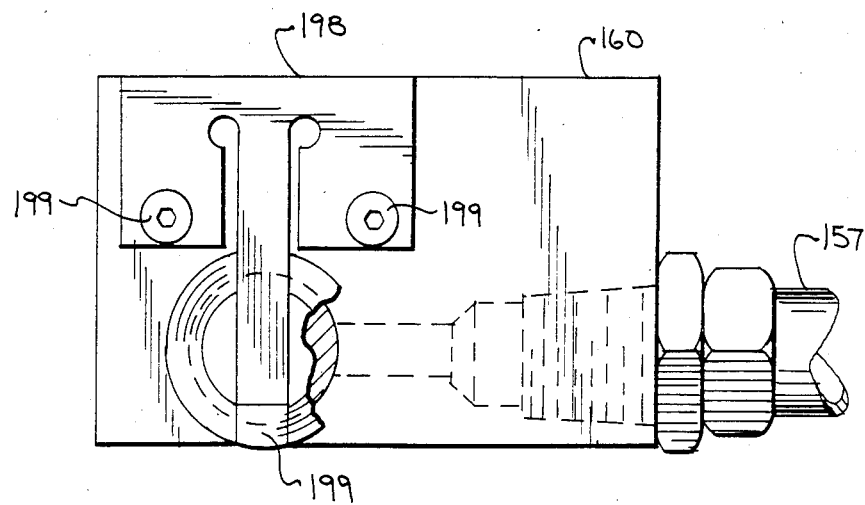
FIG. 9 is an enlarged rear elevation view of the sensor head with a portion broken away.

The cam block 182 includes flags 195 formed by raised surfaces and gaps 196 formed by recesses in the cam block (FIG. 7). As the cam block 182 travels up and down with the spindle 80, the orifice 178 will be either open, if a gap 196 is adjacent to it, or closed, if a flag 195 is adjacent to it. Seating of the orifice 178 against a flag 195 is insured by a leaf spring 198 which is secured to the sensor head 160 by screws 199 (FIG. 9). The leaf spring 198 is received by a groove 199 (FIG. 9) in the outer end of the vent 170 and urges the vent into the sensor head 160. This arrangement also keeps the vent 170 from turning inside the sensor head 160. The inner end of the vent 170 is large enough to ride on the raised surfaces of the cam block 182 even when a gap 196 is adjacent to the orifice 178. The recesses forming the gaps 196 vent the orifice 178 to the atmosphere when they are adjacent to it.

When a gap 196 is adjacent to the orifice 178 so that the orifice is open, air will flow directly from the restriction 124 to and out of the orifice 178 and be exhausted out through the gap 196. The restriction 124 and the orifice 178 are matched to insure that, under these circumstances, the pressure in the chamber 78 will be insufficient to shift the piston 72 to the forward position so that it remains in the rearward position and the spindle 80 will be driven at low speed. However, when a flag 195 blocks the orifice 178, the chamber 78 will pressurize thereby urging the piston 72 into the forward position to drive the spindle 80 at high speed.

The lengths and positions of the flags 195 and gaps 196 correspond to the thicknesses and positions of the various layers of materials in a stack of materials to be drilled. A long flag corresponds to a thick layer of soft or easy to drill material in which a high speed can be used. A gap of a certain length corresponds to a corresponding thickness of a hard or difficult to drill material requiring a slow speed. By providing the flags 195 and gaps 196 of appropriate lengths and in the proper sequence, a stack of materials having different drilling characteristics can be efficiently drilled. Also note that different stacks can be drilled by simply changing the cam block 182.

The retract vent 150 is provided as a feature to shift the drill into low speed upon retraction. As stated above, upon retraction the rearward end of the lever 112 is pivoted upwardly. Upon doing so, the lever 112 contacts a stem 203 (FIG. 4) secured in a valve disk 205 to unseat the valve disk 205 from an O-ring seat 206. This vents the pneumatic circuit 120 to shift the piston 72 to the slow, rearward position. Normally, the valve disk 205 is held against the seat 206 by a compression spring 207 which is secured in the retract vent 150 by a screw 208. The stem 203 extends slightly above the disk 205 to locate the spring 207 on the disk.

Figure 6:
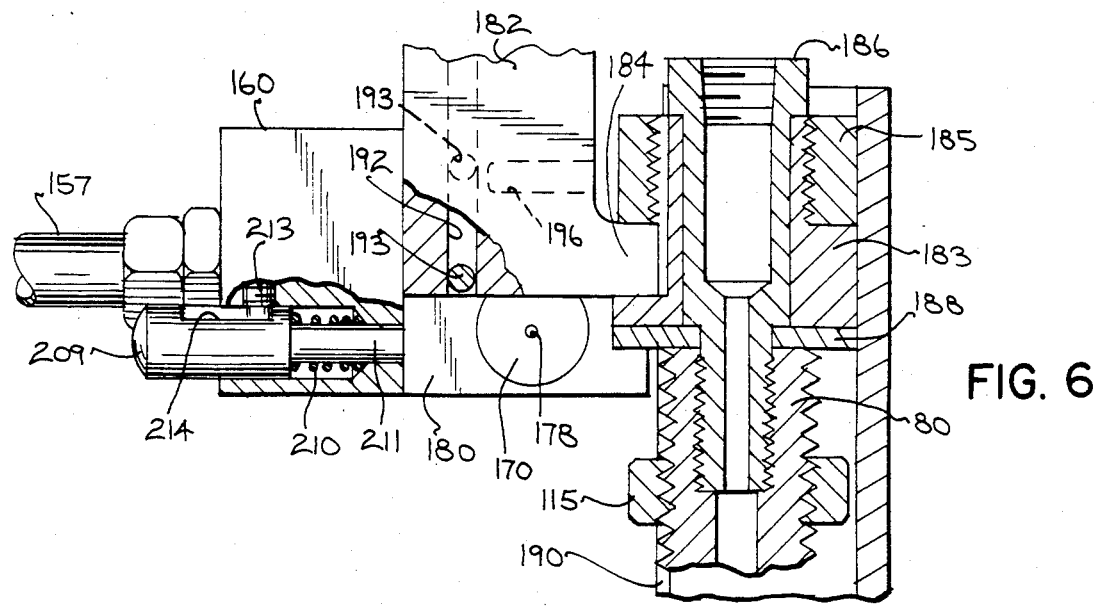
FIG. 6 is a detail side view illustrating a set-up button for the sensor head of FIG. 5.
Figure 8:
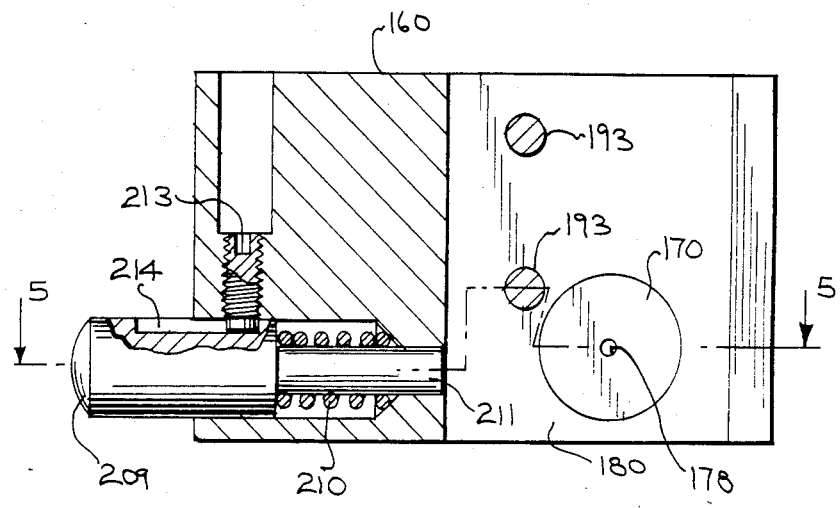
FIG. 8 is a sectional view of the sensor head alone taken along the plane of the line 8—8 of FIG. 5.

As the bit 14 is used, it will wear and will eventually have to be sharpened or replaced. At that time, the sensor head 160 will have to be readjusted to accommodate the new length of the bit 14. This is easily accomplished by first lowering the spindle 80 until the new or sharpened bit 14 is in position to begin drilling. Normally, this will be when the bit 14 is in contact with the top layer of the workpiece to be drilled. The cap screws 163 are then loosened and the sensor head 160 is slid down the post 153 until a set-up button 209 can be pressed in, against the urging of a compression spring 210 (FIGS. 5, 6 and 8), and an end 211 of the set-up button 209 clears the bottom of the cam block 182. The sensor head 160 is then slid up until the end 211 abuts the bottom of the cam block 182 and the cap screws 163 are tightened. This sets a reference point of the sensor head 160 relative to the workpiece W so that the cam block 182 is in the starting position relative to the orifice 178. In the preferred embodiment, it is desirable that the drill start in the slow speed. Therefore, the orifice 178 is just below the level of the upper side of the end 211 of the button 209 (FIG. 6). A set screw 213 is received by a groove 214 in the button 209 to hold the button 209 in the sensor head 160.

Note that the invention is not limited to use with a positive feed drill. It could also be adapted to work with a drill fed by an air-cylinder/damping system or even with a manually fed drill. In these cases, only the speed of the bit 14 would be changed, since the feed is continuous, being as fast as the bit can cut.

Many modifications and variations to the preferred embodiment in addition to those mentioned above will be apparent to those skilled in the art which will still result in drills within the spirit and scope of the preferred embodiment. For example, the sensor head 160 could be mounted to move in translation with the bit and the cam block could be stationary. Therefore, the invention is not intended to be limited by the description or drawings of the preferred embodiment, but only by the claims which follow.

We claim:

1. A drill for rotationally driving a bit into a workpiece at one of the two speeds according to the depth of the bit in the workpiece, comprising:
   a cam block element having a flag section and a gap section;
   a vent element having an orifice adapted to be closed adjacent to the flag section and open adjacent to the gap section;
   one of said elements being mounted to move in translation with the bit and the other of said elements being mounted to be stationary with respect to the workpiece, with the orifice and the cam block element in operative relationship to one another so that either the flag section or the gap section is adjacent to the orifice according to the depth of the bit in the workpiece;

shifting means responsive to pneumatic pressurization for changing the rotational speed of the bit from one speed to the other speed;

supply means adapted for connection to a source of compressed air; and means for providing communication between the supply means, the shifting means and the orifice;

wherein the orifice vents the shifting means when it is adjacent to the gap section to drive the bit at one speed and seals the shifting means when it is adjacent to the flag section to change the speed of the bit to the other speed according to the depth of the bit in the workpiece; and vent means responsive to retraction of the bit from the workpiece to depressurize the shifting means thereby shifting to the lower of the two speeds upon retraction of the bit.

2. A drill for rotationally driving a bit into a workpiece at one of two speeds according to the depth of the bit in the workpiece, comprising:

a cam block element having a flag section and a gap section;

a vent element having an orifice adapted to be closed adjacent to the flag section and open adjacent to the gap section;

one of said elements being mounted to move in translation with the bit and the other of said elements being mounted to be stationary with respect to the workpiece, with the orifice and the cam block element in operative relationship to one another so that either the flag section or the gap section is adjacent to the orifice according to the depth of the bit in the workpiece;

shifting means responsive to pneumatic pressurization for changing the rotational speed of the bit from one speed to the other speed;

supply means adapted for connection to a source of compressed air; and means for providing communication between the supply means, the shifting means and the orifice;

wherein the orifice vents the shifting means when it is adjacent to the gap section to drive the bit at one speed and seals the shifting means when it is adjacent to the flag section to change the speed of the bit to the other speed according to the depth of the bit in the workpiece; and wherein the supply means includes a restriction between the source of compressed air and the communication means sized in relation to the orifice to provide a pressure in the shifting means which is insufficient to cause the drill to change from the one speed to the other speed when the orifice is open.

3. A drill for rotationally driving a bit into a workpiece at one of two speeds according to the depth of the bit in the workpiece, comprising:

a spindle for mounting the bit;

a cam block element having a flag section and a gap section;

a vent element having an orifice adapted to be closed adjacent to the flag section and open adjacent to the gap section;

one of said elements being mounted to move in translation with the spindle and the other of said elements being mounted to be stationary relative to the workpiece, with the orifice and the cam block element in operative relationship to one another so that either the flag section or the gap section is adjacent to the orifice according to the depth of the bit in the workpiece;

a planetary gear unit for driving the spindle, said planetary gear unit comprising;

a sun gear adapted to be driven rotationally at a high speed;

planet gears adapted to orbit around the sun gear at a low speed; and a planet cage journalling the planet gears to revolve around the sun gear with the planet gears at the low speed;

a transmission output shaft;

gear means for coupling the transmission output shaft to the spindle;

shifting means responsive to pneumatic pressurization for shifting between coupling the transmission output shaft directly to the sun gear or to the planet cage to change the rotational speed of the spindle;

supply means adapted for connection to a source of compressed air; and means for providing communication between the supply means, the shifting means and the orifice;

wherein the orifice vents the shifting means when it is adjacent to the gap section to drive the transmission output shaft with the planet cage at the low speed and seals the shifting means when it is adjacent to the flag section to drive the transmission output shaft with the sun gear at the high speed thereby changing the speed of the bit in response to the depth of the bit in the workpiece.

4. A drill as in claim 3, wherein the supply means includes a restriction between the source of compressed air and the shifting means and vent element sized in relation to the orifice to provide a pressure in the shifting means which is insufficient to cause the drill to change from the first speed to the second speed when the orifice is open.

5. A drill as in claim 4, further comprising vent means responsive to retraction of the bit from the workpiece to depressurize the shifting means thereby shifting the bit to the low speed.

6. A drill as in claim 5, wherein the shifting means comprises:

an annular piston shiftable by pneumatic pressurization from a first axial position to a second axial position;

a clutch cup mounted on the transmission output shaft to be rotationally engaged with and axially slidable relative to the output shaft;

bearing means coupling the annular piston to the clutch cup so that the annular piston remains rotationally stationary and the clutch cup moves axially with the annular piston between the first and second positions; and biasing means for urging the clutch cup into the first position;

wherein the clutch cup has lugs at an axial end which mate with corresponding lugs on the planet cage in the first position and has a clutch half on the inside thereof which mates in the second position with a clutch half driven at the speed of the sun gear.

7. A drill as in claim 6, wherein each of the lugs have driving faces in a radial plane to assure positive transmission of driving forces and opposite faces which are angled to enable the respective lugs on the clutch cup and planet cage to overrun one another when the clutch cup is shifted to engage the planet cage.

8. In a drill for rotationally driving a bit into a workpiece made up of at least two layers, one layer being adapted to be drilled at one speed and the other layer being adapted to be drilled at another speed, the improvement comprising:

- a cam block element having a gap section corresponding in length and position to the respective thickness and position of one layer and a flag section corresponding in length and position to the respective thickness and position of the other layer;
- a vent element having an orifice adapted to be closed adjacent to the flag section and open adjacent to the gap section;
- one of said elements being mounted to move in translation with the bit as it bores through the workpiece and the other of said elements being mounted to be stationary with respect to the workpiece, the gap section being adjacent to the orifice as the bit bores through the corresponding layer and the flag section being adjacent to the orifice as the bit bores through the corresponding layer;
- shifting means responsive to pneumatic pressurization for changing the speed of the bit between the two speeds as the bit bores from one layer to the other;
- supply means adapted for conection to a source of compressed air; and
- means for providing communication between the supply means, the shifting means and the orifice;
- wherein the orifice vents the shifting means to drive the bit at the one speed through the corresponding layer and seals the shifting means to drive the bit at the other speed through the corresponding layer.

9. The improvement of claim 8, further comprising vent means responsive to retraction of the bit from the workpiece to depressurize the shifting means and shift to the lower of the two speeds upon retraction of the bit.

* * * * *